US012571420B2

(12) United States Patent
Size, Jr.

(10) Patent No.: US 12,571,420 B2
(45) Date of Patent: * Mar. 10, 2026

(54) MULTI-PIECE LOCKING FASTENER ASSEMBLY SUCH AS FOR SECURING A WHEEL RIM TO A VEHICLE HUB

(71) Applicant: Earl Allen Size, Jr., Rochester Hills, MI (US)

(72) Inventor: Earl Allen Size, Jr., Rochester Hills, MI (US)

(*) Notice: Subject to any disclaimer, the term of this patent is extended or adjusted under 35 U.S.C. 154(b) by 895 days.

This patent is subject to a terminal disclaimer.

(21) Appl. No.: 17/474,533

(22) Filed: Sep. 14, 2021

(65) Prior Publication Data

US 2022/0003263 A1 Jan. 6, 2022

Related U.S. Application Data

(63) Continuation-in-part of application No. 16/507,104, filed on Jul. 10, 2019, now Pat. No. 11,168,729.

(Continued)

(51) Int. Cl.
*F16B 39/00* (2006.01)
*B60B 3/16* (2006.01)
(Continued)

(52) U.S. Cl.
CPC .............. *F16B 39/30* (2013.01); *B60B 3/165* (2013.01); *F16B 5/0241* (2013.01); *F16B 23/0038* (2013.01)

(58) Field of Classification Search
CPC .... F16B 39/30; F16B 5/0241; F16B 23/0038; B60B 3/165
(Continued)

(56) References Cited

U.S. PATENT DOCUMENTS

| | | |
|---|---|---|
| 885,544 A | 4/1908 | Summons |
| 893,081 A | 7/1908 | Kunan |

(Continued)

FOREIGN PATENT DOCUMENTS

| | | |
|---|---|---|
| DE | 4440240 C1 | 5/1996 |
| EP | 0178787 A2 | 4/1986 |

(Continued)

OTHER PUBLICATIONS

International Search Report and Written Opinion for Application No. PCT/US2022/075880, mailed Dec. 15, 2022, 15 pages.

*Primary Examiner* — Christine M Mills
*Assistant Examiner* — Dil K. Magar
(74) *Attorney, Agent, or Firm* — Dinsmore & Shohl LLP

(57) ABSTRACT

A multi-piece locking fastener having an intermediate component exhibiting a plurality of interior threads arrayed in a first direction. A first fastener has a first enlarged head and a first stem exteriorly threaded in the first direction. A hollowed interior is formed in an end of the stem and exhibits a further plurality of interior threads extending in a second direction opposite the first direction. A second fastener has a second enlarged head and a second stem, upon which is configured a second exterior thread pattern extending in the second direction. The first fastener is installed through the intermediate component from a first direction, with the second fastener rotationally inter-engaging the exposed interior threads of the first fastener in the second direction until the second enlarged heads contact the intermediate component, with loosening of either of the first and second fasteners being prevented.

4 Claims, 4 Drawing Sheets

Related U.S. Application Data

(60) Provisional application No. 62/816,964, filed on Mar. 12, 2019.

(51) Int. Cl.
  F16B 5/02 (2006.01)
  F16B 23/00 (2006.01)
  F16B 39/30 (2006.01)

(58) Field of Classification Search
  USPC .......................................... 411/190, 214, 215
  See application file for complete search history.

(56) References Cited

U.S. PATENT DOCUMENTS

| | | | |
|---|---|---|---|
| 932,395 | A | 8/1909 | Kenney |
| 1,138,574 | A | 5/1915 | King |
| 1,357,331 | A | 11/1920 | Le Fauve |
| 1,399,191 | A | 12/1921 | Casali |
| 2,956,293 | A | 10/1960 | McKay |
| 3,222,977 | A | 12/1965 | Vaughn |
| 4,043,239 | A | 8/1977 | DeFusco |
| 4,253,509 | A | 3/1981 | Collet |
| 5,314,279 | A | 5/1994 | Ewing |
| 5,391,032 | A | 2/1995 | Vassalotti |
| 5,544,991 | A | 8/1996 | Richardson |
| 5,562,379 | A | 10/1996 | Rausch et al. |
| 5,636,905 | A | 6/1997 | Pagacz |
| 5,855,463 | A | 1/1999 | Newby |
| 6,676,874 | B1 | 1/2004 | Muller |
| 6,789,993 | B2 | 9/2004 | Ozawa et al. |
| 6,913,144 | B1 * | 7/2005 | Todd .......................... G09F 5/00 |
| | | | 206/388 |
| 6,916,144 | B2 * | 7/2005 | Lees ....................... F16B 39/16 |
| | | | 411/13 |
| 7,857,567 | B2 | 12/2010 | Iwata et al. |
| 8,113,754 | B2 * | 2/2012 | Dahl ........................ F16B 39/02 |
| | | | 411/320 |
| 8,172,496 | B2 * | 5/2012 | Vile ......................... F16B 39/16 |
| | | | 411/190 |
| 8,267,630 | B2 | 9/2012 | Moon et al. |
| 8,398,349 | B2 * | 3/2013 | Jackson .................. F16B 39/08 |
| | | | 411/215 |
| 8,402,605 | B2 | 3/2013 | Courtin et al. |
| 9,714,675 | B2 * | 7/2017 | Schepergerdes ........ F16B 39/08 |
| 9,757,867 | B2 * | 9/2017 | Heine ..................... B26B 13/28 |
| 9,944,116 | B1 * | 4/2018 | Roberts ................... B60B 7/068 |
| 10,639,931 | B2 | 5/2020 | Price |
| 10,744,817 | B2 * | 8/2020 | Chen ....................... B60B 3/147 |
| 2005/0025607 | A1 | 2/2005 | Guantonio |
| 2008/0056809 | A1 | 3/2008 | Kielczewski et al. |
| 2009/0090146 | A1 * | 4/2009 | Bosman .................... B60B 7/16 |
| | | | 70/225 |
| 2014/0105706 | A1 | 4/2014 | Koenig |
| 2016/0303897 | A1 * | 10/2016 | Niemczyk ............... B60B 11/02 |
| 2017/0021478 | A1 | 1/2017 | Junkers et al. |
| 2018/0094458 | A1 * | 4/2018 | Dhadda .................... B60B 7/16 |
| 2019/0003513 | A1 | 1/2019 | Junkers et al. |
| 2019/0316614 | A1 * | 10/2019 | Kwiatkowski ............ F16B 5/02 |
| 2020/0386258 | A1 | 12/2020 | Size, Jr. |

FOREIGN PATENT DOCUMENTS

| | | | |
|---|---|---|---|
| EP | 0634583 | A1 | 1/1995 |
| JP | 07004418 | A | 1/1995 |
| JP | H8232932 | A | 9/1996 |
| JP | 3137118 | U | 11/2007 |
| JP | 2009204153 | A | 9/2009 |
| KR | 20130068066 | A | 6/2013 |
| WO | 2015054722 | A1 | 4/2015 |

* cited by examiner

MULTI-PIECE LOCKING FASTENER ASSEMBLY SUCH AS FOR SECURING A WHEEL RIM TO A VEHICLE HUB

CROSS REFERENCE TO RELATED APPLICATIONS

The present application claims the priority of U.S. Ser. No. 16/507,104 filed Jul. 10, 2019. The '104 application claims the priority of U.S. Ser. No. 62/816,964 filed Mar. 12, 2019.

FIELD OF THE INVENTION

The present invention relates generally to fastener assemblies. More specifically, the present invention discloses a multi-piece locking fastener incorporating a plurality of lug nut shaped intermediate components for use in a first application for securing a wheel rim to a vehicle hub, in combination with opposing pluralities of first and second fasteners for preventing loosening in response to such as vibrations and the like. In a further application, the present invention teaches a related fastener assembly in which the intermediate component is reconfigured as a plate having a threaded aperture in a first direction being bolted through an aligning aperture in another stacked plate without threads. The head of a bolt contacts the plate without threads and is threaded through the intermediate plate and then attached to an opposing retaining fastener.

BACKGROUND OF THE INVENTION

The prior art is documented with examples of fasteners, such as which are configured in an attempt to prevent loosening when employed in dynamic environments. A first and most basic example of this is the conventional threaded bolt fastener with attachable and interiorly threaded nut. A spring washer can either be integrated into the nut or separately provided.

Other examples include the locking threaded fastener of Ewing, U.S. Pat. No. 5,314,279, which teaches a locking threaded fastener of the wedge-action type with threaded and threadless nut members with wedge elements therebetween for wedging the nut members apart when the threaded nut member is turned in the loosening direction. In a two-piece nut, the threadless nut member has a flat inner surface for engaging the workpiece and the wedge elements have engaging surfaces with a coefficient of friction therebetween which is less than that between the flat inner surface and the workpiece surface. In a three-piece nut, a third nut member, in the form of a washer, is provided with a flat inner surface for engaging the workpiece. The wedge elements have engaging surfaces with a coefficient of friction less than that between the third nut member and the threadless nut member which, in turn, is less than that between the third nut member in the workpiece.

U.S. Pat. No. 5,562,379, to Rausch et al., teaches a vibration resistant fastener having a pin and a collar. The pin is threaded or peripherally grooved. At a central location, the major diameter of the thread or groove is reduced to a diameter which is still larger than its minor diameter. A collar is threaded or swaged on to the pin and collar material is pressed into an open region that was formed by the reduction of the major diameter, to form a thread lock.

SUMMARY OF THE PRESENT INVENTION

The present invention discloses a multi-piece locking fastener assembly which, in a first variant, is provided for securing a wheel rim to a vehicle hub including an intermediate component in the form of a lug nut having a plurality of interior threads arrayed in a first direction. A first fastener has a first enlarged head and a first stem with a solid first portion extending from the first enlarged head, a second portion extending from said first portion and being exteriorly threaded in the first direction. A hollowed interior is formed in an end of the second portion and exhibits a further plurality of interior threads extending in a second direction opposite to the first direction.

A second fastener is provided having a second enlarged head and a second stem, upon which is configured a second exterior thread pattern extending in the second direction. A plurality of the first fasteners are adapted to being installed through a circumferential array of apertures in the hub and aligning apertures in the wheel rim so that said threaded second portions project upwardly from the wheel rim.

A plurality of the lug nuts are threadably engaged to the threaded exteriors of the first fastener stems projecting from the rim. A plurality of the second fasteners are then rotationally inter-engaged with the exposed interior threads of the first fasteners in the second direction until the second enlarged heads contact the lug nuts, with loosening of either of the first and second fasteners being prevented.

In a second variant, the present invention teaches a related fastener assembly in which the intermediate component is reconfigured as a plate having a threaded aperture in a first direction bolted through an aligning aperture in another stacked plate without threads. The head of a bolt contacts the plate without threads and is threaded through the intermediate plate and then attached to an opposing retaining fastener. The description of the first and second fasteners is substantially the same as described in the variant of FIGS. 1-4. The first fastener however does not necessary require the stem to include each of solid and hollowed portions as previously shown.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
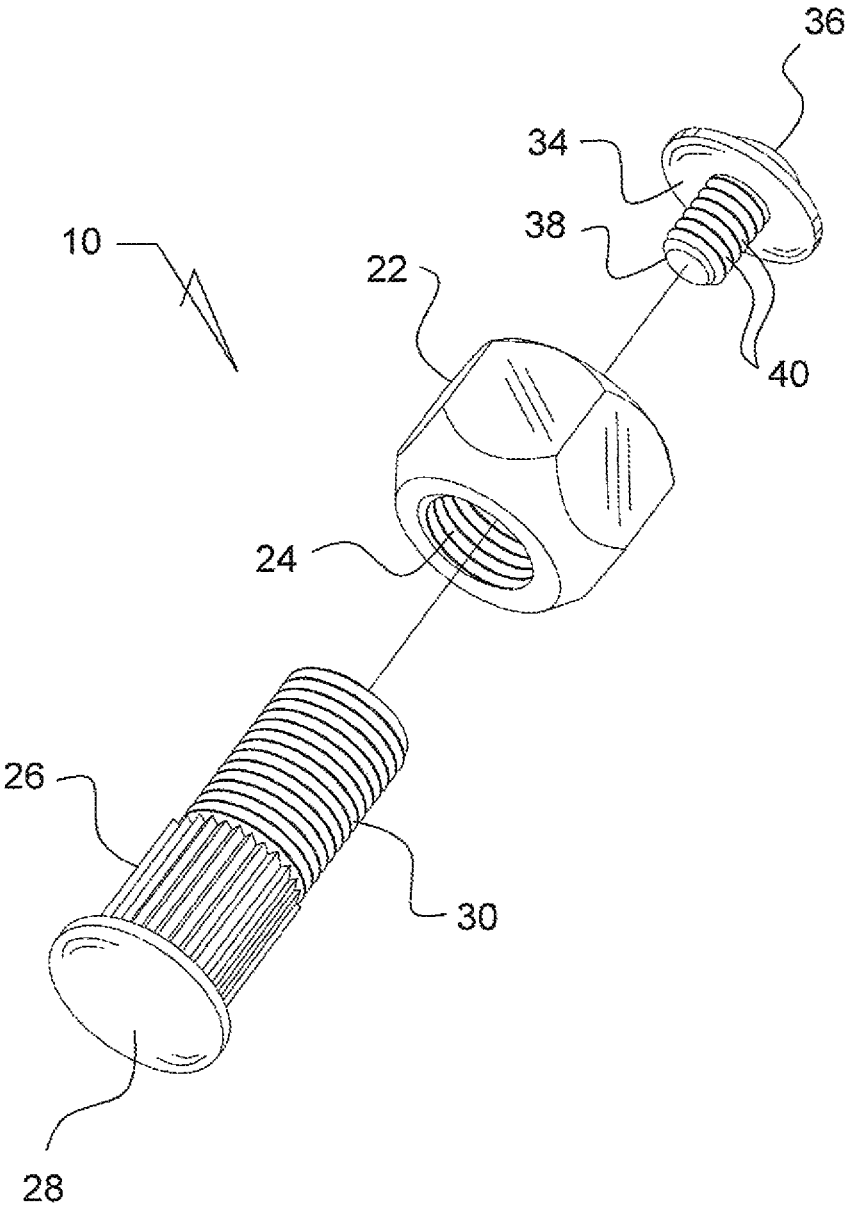
FIG. 1 is an exploded view of the multi-piece locking fastener assembly according to a first variant of the present invention.
Figure 2:
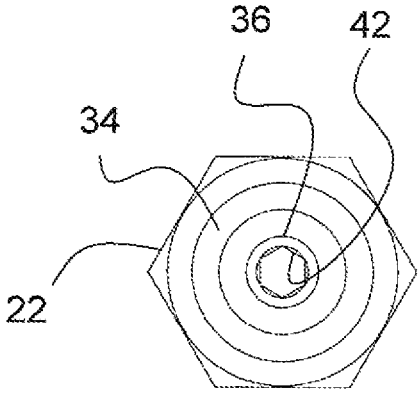
FIG. 2 is a top plan view of the fastener assembly of FIG. 1 showing a selected lug nut and second fastener.
Figure 3:
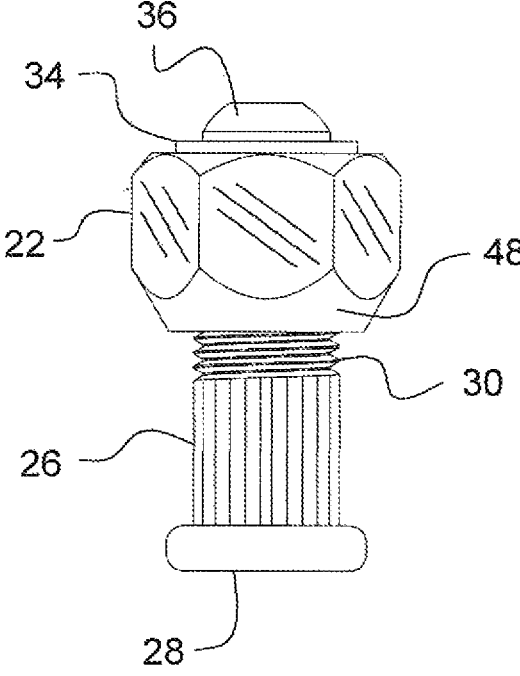
FIG. 3 is a side assembled view of the fastener assembly of FIG. 1.
Figure 5:
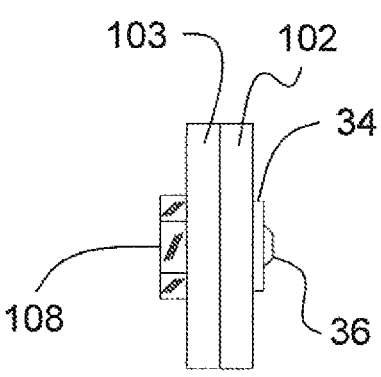
FIGS. 5 and 6 present respective side and front views of the fastener assembly according to a second variant.
Figure 6:
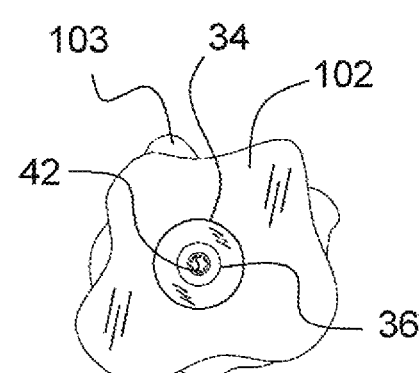
Figure 7:
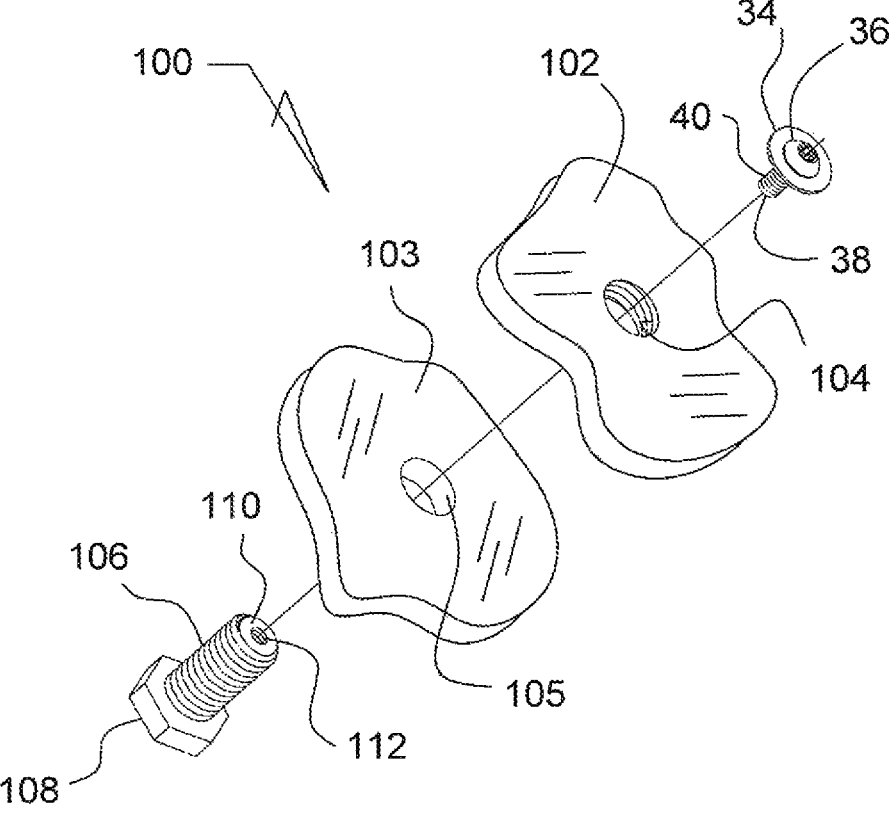
FIG. 7 is an exploded view of the fastener assembly of FIG. 5.

With reference to the attached illustrations, and in particular FIGS. 1-3 in reference to a first variant 10 and subsequent FIGS. 5-7 for a second variant 100, the present invention discloses a multi-piece locking fastener assembly providing the advantages of counter-threaded rotation support to prevent loosening in use with any dynamic (including vibratory) environment.

Figure 4:
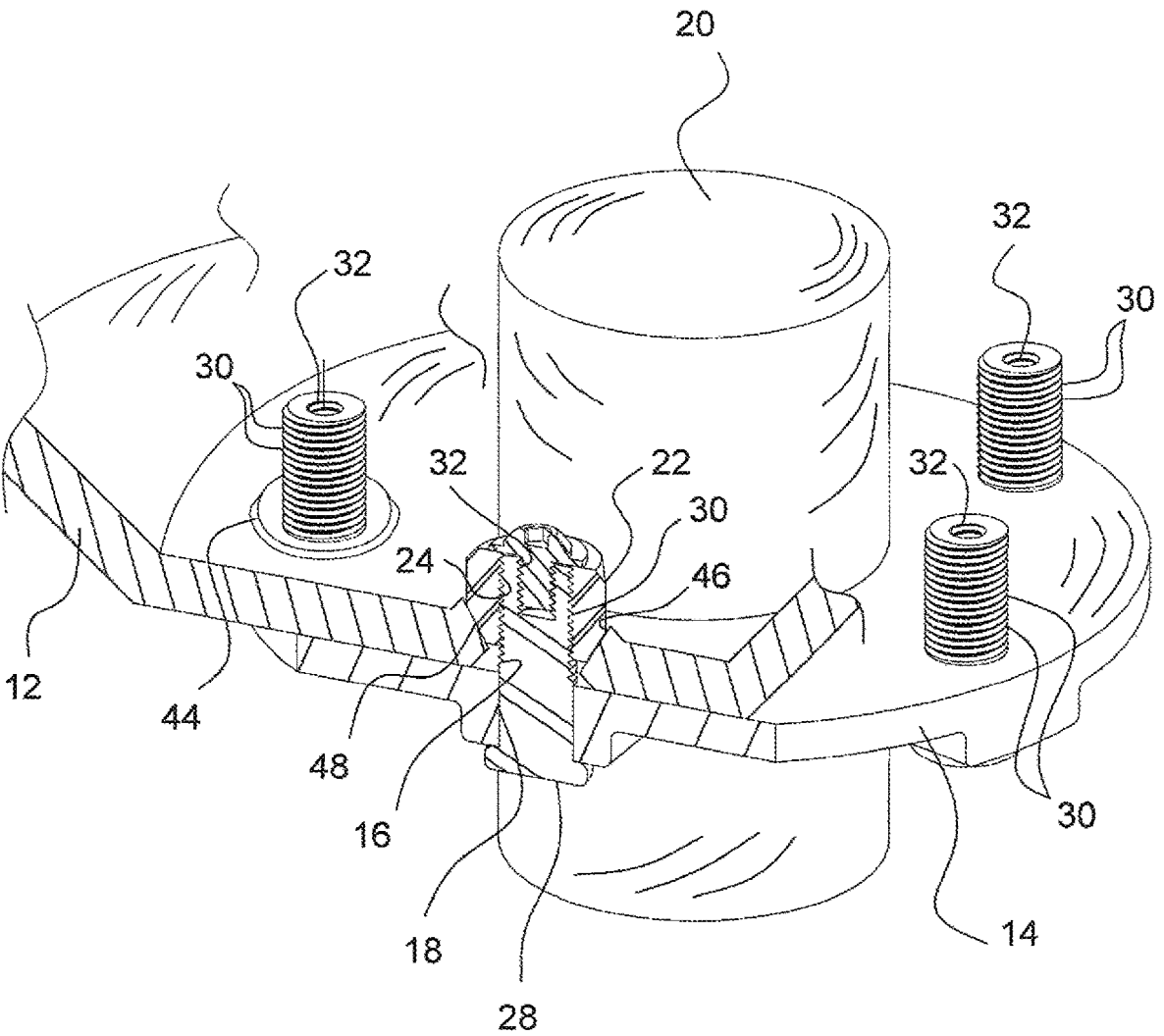
FIG. 4 is an environmental view depicting a plurality of fastener assemblies securing a wheel rim to a vehicle hub.

Referring again to FIGS. 1-4, the assembly 10 in the first variant is provided for securing a wheel rim 12 to a vehicle hub 14 (see environmental view of FIG. 4). As further shown, each of the rim 12 and hub 14 include a plurality of circumferentially arrayed and aligning apertures (typically including multiple sets of aligning apertures) and which is depicted in FIG. 4 in cutaway by selected aperture 16 in the wheel rim 12 which aligns and overlays with aperture 18 in the outer rim edge of the wheel hub 14. The hub 14 in FIG. 5 can also include a central axis 20 for rotation thereof of the hub, wheel rim and supported vehicle tire (not shown).

An intermediate component 22 is provided in the form of a plurality of individual lug nuts, one of which is shown and each having a plurality of interior threads 24 arrayed in a first direction and extending between opposite open ends (see cutaway in FIG. 4). As further shown, the lug nuts 22 can exhibit a conventional hex configuration as is known in the art and can be constructed of any of a steel or other rigid material not limited to metal or plastic composites.

A first fastener 26 is provided and has a first enlarged head 28 and a first stem with a first portion (see again as referenced at 26) which is shown as serrated, however which can be any of smooth or threaded extending from the first enlarged head 28. A second portion extends from the first portion and is exteriorly threaded (at 30) in the first direction. As further shown in the cutaway of FIG. 4, a hollowed interior is formed in an open end of the second portion 30 and exhibits a further plurality of interior threads 32 extending in a second direction opposite to the first direction.

A second fastener 34 is provided having a second enlarged head 36 and a second stem 38, upon which is configured a second exterior thread pattern 40 extending in the second direction. The second fastener can also include a separate or integrated enlarged washer portion (see again at 34). A tool bit engage-able recess profile is configured within the second enlarged head 36 and, without limitation, is depicted by such as a hex key pattern 42 (see top view of FIG. 2)

In use, a plurality of the first fasteners 26 are adapted to being installed through the circumferential array of apertures 18 in the hub 14 (see again FIG. 4) and aligning apertures 16 in the wheel rim 12 so that the exterior threaded apertures 30 configured upon the second portions project upwardly from the wheel rim. Without limitation, the present invention also contemplates the first fasteners as depicted being integrally constructed with the vehicle hub 14.

A plurality of the lug nuts 22 are then threadably engaged to the threaded exteriors 30 of the first fastener stems projecting from the rim 12 and in a first installing direction. A plurality of the second fasteners 34 are then rotationally inter-engaged with the exposed interior threads 32 of the first fasteners 26 in the second direction until the second enlarged heads 36 contact the annular top surfaces of the lug nuts 22 (see FIGS. 3-4), with loosening of either of the first 26 and second 34 fasteners being prevented.

Additional features include additional washers 44 (see as shown in FIG. 4) supported upon the wheel rim upper surface and through which the exterior threaded 30 second portions of the first fasteners project. Alternatively, and as shown in partial cutaway in FIG. 4, the annular defined apertures associated with the vehicle rim 12 can exhibit a sloped or angled profile 46 which can mirror a sloped lower circumferential exterior profile 48 (see as best shown in FIG. 3) configured in the intermediate lug nuts 22.

With reference to each of FIGS. 5-7, and in the second variant 100, the fastener assembly of the present invention contemplates the intermediate component (previously depicted by lug nut 22) being reconfigured as a plate 102 having an interior threaded aperture (see threads 104 configured within inner rim defining aperture in the exploded view of FIG. 7, the threads 104 being arrayed in a first direction. A further underneath stacked plate 103 exhibits an aligning aperture (see inner rim 105) without threads.

The first fasteners are reconfigured from what is shown at 26 in the first variant and include an exteriorly threaded first stem 106 (these threads extending in a first direction corresponding to the direction of the threads 104 within the first plate 102) and an enlarged first hex head 108.

As further shown in the exploded view of FIG. 7, a hollowed interior is formed in an open end 110 of the first stem 106 and is depicted by a further plurality of interior threads 112 extending in a second direction opposite to the first direction depicted by the exterior threads 106.

The second fastener 34 is repeated from that shown in FIGS. 1-4 and again includes the second enlarged head 36 and second stem 38, upon which is configured a second exterior thread pattern 40 extending in the second direction. As previously described, the second fastener can also include a separate or integrated enlarged washer portion (see again at 34) along with a tool bit engage-able recess profile (again exhibited by hex key pattern at 42) configured within the second enlarged head 36.

In use, the enlarged head 108 of the first fastener 106 (typically exhibiting a bolt shape) contacts the second or lower plate 103 with the non-threaded aperture 105, with the exterior threads 106 of the first fastener stem being threaded through the interior threads 104 defined in the intermediate (or first) plate 102 and then attached to the opposing and retaining second fastener 34 in the manner previously described. The first and second fasteners are further each as substantially constructed in the first described variant.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including". "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third". "primary", "secondary". "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A multi-piece locking fastener assembly, comprising:
a first plate having an aperture within which are configured a plurality of interior threads arrayed in a first direction;
a second plate having a further aperture in alignment with said first interiorly threaded aperture;
a first fastener having a first enlarged head and a first stem exteriorly threaded in the first direction, a hollowed interior formed in an end of said first stem and exhibiting a further plurality of interior threads extending in a second direction opposite to the first direction;
a second fastener having a second enlarged head and a second stem, upon which is configured a second exterior thread pattern extending in the second direction;
said first fastener being installed through said second plate and subsequently threadably engaged through said first plate so that said threaded stem projects upwardly therefrom; and
said second fastener rotationally inter-engaging said exposed interior threads of said first fastener in the second direction until said second enlarged heads contact a surface of said first plate, with loosening of either of said first and second fasteners being prevented.

2. The fastener assembly of claim 1, said second fasteners each further comprising an enlarged washer portion integrated between said second enlarged heads and said second stems.

3. The fastener assembly of claim 1, said second enlarged head of said second fastener further comprising a tool bit engage-able recess profile.

4. The fastener assembly of claim 3, said tool bit engageable recess profile further comprising a hex key pattern.

* * * * *